United States Patent [19]
Williamson et al.

[11] Patent Number: 5,336,036
[45] Date of Patent: Aug. 9, 1994

[54] PORTABLE COMPACTOR SYSTEM FOR AGRICULTURAL FILMS

[75] Inventors: Keith S. Williamson, Hartsville, S.C.; Terry A. Ochab, Orlando, Fla.

[73] Assignee: Sonoco Products Company, Hartsville, S.C.

[21] Appl. No.: 986,941

[22] Filed: Dec. 8, 1992

[51] Int. Cl.$^5$ .............................. B60P 1/00
[52] U.S. Cl. ................... 414/502; 414/523; 414/525.2; 414/528; 414/786; 100/41; 100/215; 100/250
[58] Field of Search ............... 414/786, 501, 502, 505, 414/503, 523, 528, 518, 525.2; 100/35, 41, 255, 250, 215, 189

[56] References Cited

U.S. PATENT DOCUMENTS

| | | |
|---|---|---|
| 1,114,681 | 10/1914 | Duncan .................... 100/189 |
| 1,588,681 | 6/1926 | Haney ..................... 100/189 |
| 2,923,487 | 2/1960 | Wands et al. . |
| 3,181,455 | 5/1965 | Gouker et al. . |
| 3,473,755 | 10/1969 | Brown . |
| 3,625,140 | 12/1971 | Glanz . |
| 3,839,852 | 10/1974 | Jebens . |
| 4,050,972 | 9/1977 | Gardinal, Jr. . |
| 4,057,010 | 11/1977 | Smith . |
| 4,084,763 | 4/1978 | Zamboni . |
| 4,144,806 | 3/1979 | Broussard . |
| 4,198,904 | 4/1980 | Cheale et al. . |
| 4,242,953 | 1/1981 | St-Gelnis . |
| 4,394,052 | 7/1983 | Adams et al. . |
| 4,401,022 | 8/1983 | Vissers et al. . |
| 4,635,544 | 1/1987 | Taylor ..................... 100/255 |
| 4,979,866 | 12/1990 | Croy . |
| 5,009,062 | 4/1991 | Urich et al. . |

FOREIGN PATENT DOCUMENTS 2399796  8/1977  France .

Primary Examiner—Cheryl L. Gastineau
Attorney, Agent, or Firm—Dennison, Meserole, Pollack & Scheiner

[57] ABSTRACT

A system for film mulch disposal including a field-traveling compaction chamber adapted to gravity receive manually pregathered bundles of film loaded on a hopper-feeding conveyor. A reciprocating ram compacts the pregathered bundles within the compaction chamber and is manually controlled by an operator positioned for direct visual inspection of the apparatus.

8 Claims, 2 Drawing Sheets

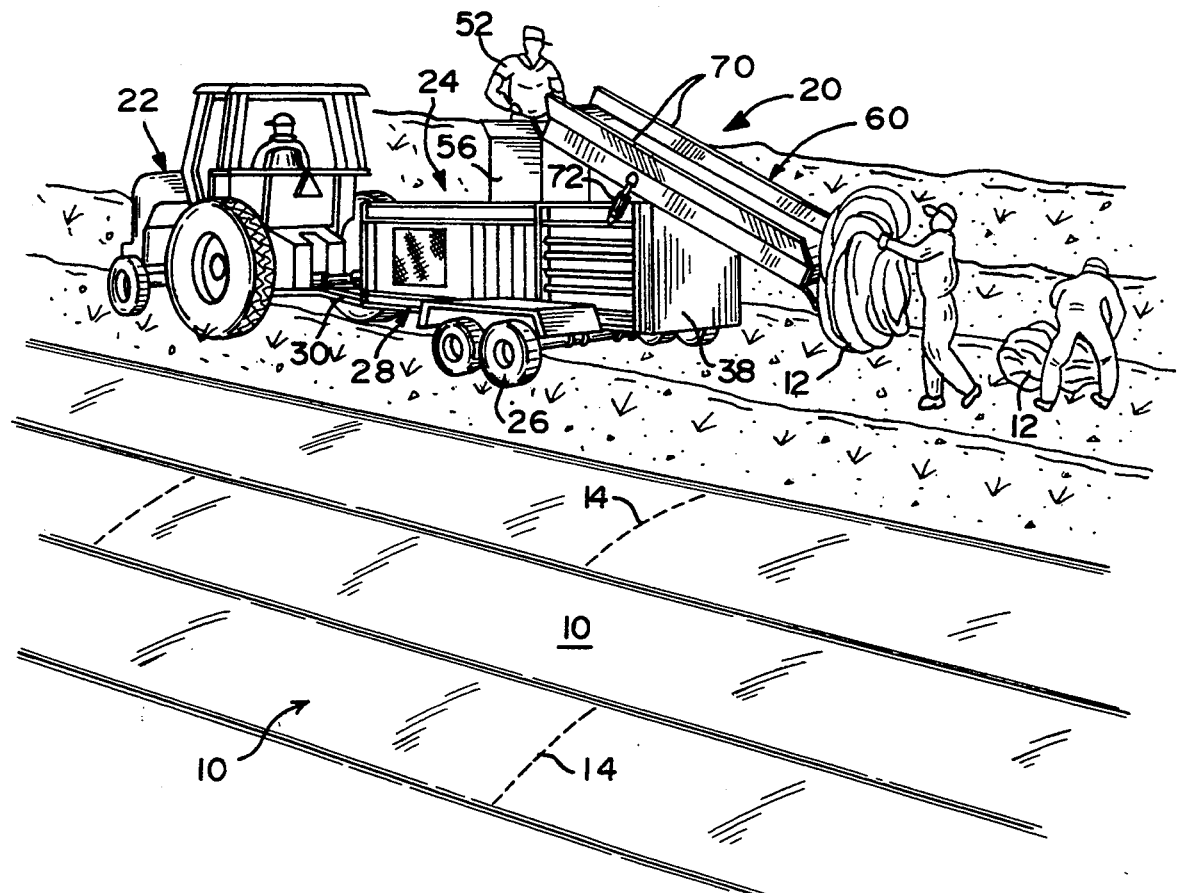
FIG_1
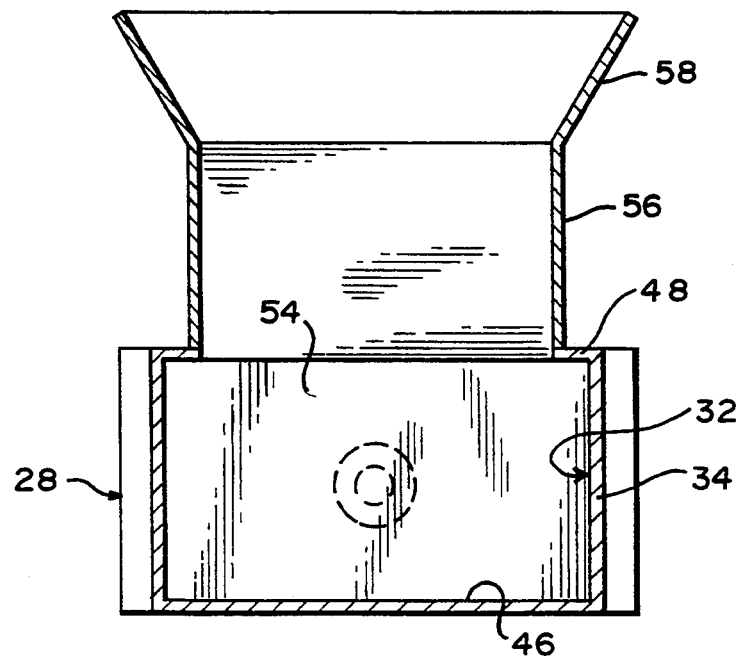
FIG_4

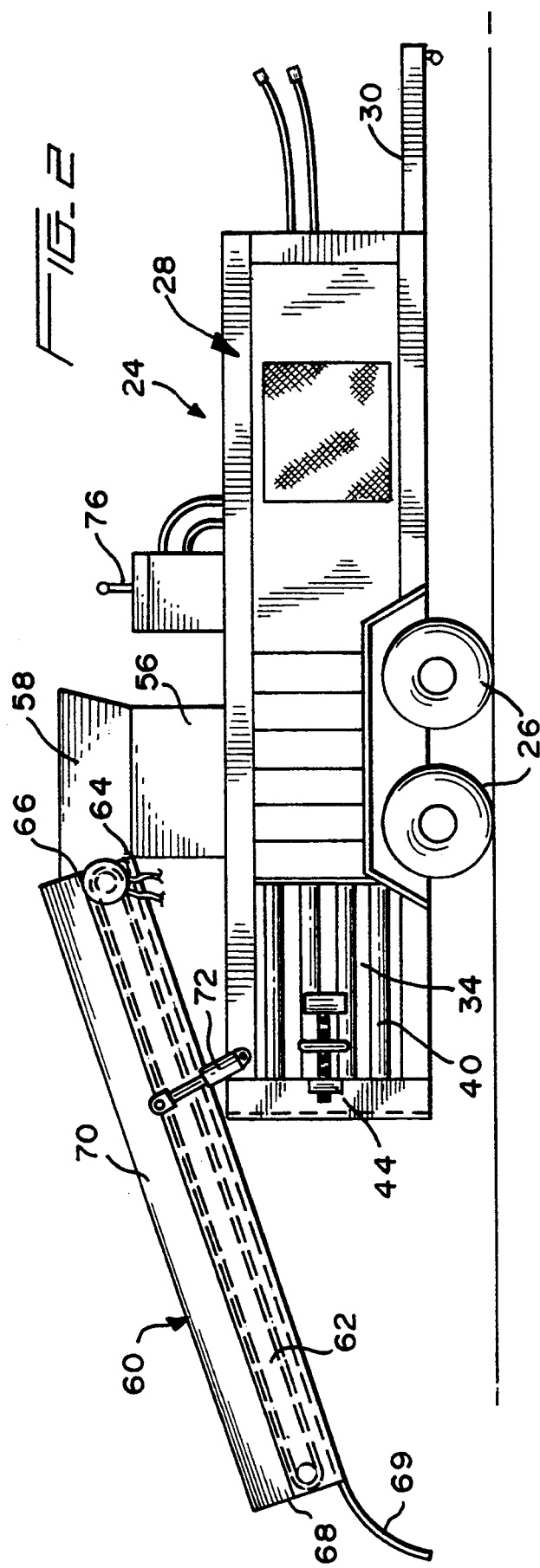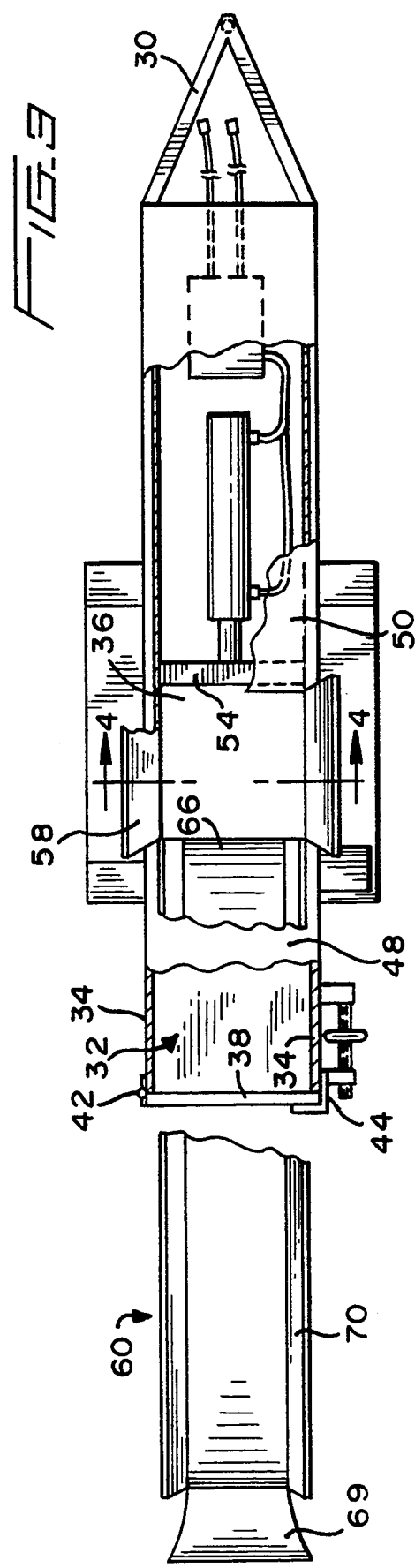

PORTABLE COMPACTOR SYSTEM FOR AGRICULTURAL FILMS

BACKGROUND OF THE INVENTION

Plastic film mulch, normally in the nature of sheets of polyethylene several hundred or several thousand feet in length, is used extensively as a cultivation aid in large field operations in particular. However, a major problem exists with regard to the periodic necessity for removal of the film mulch.

Any attempt to rewind the film mulch for reuse would be highly impractical. As such, standard procedures involve the disposal of the used mulch. This disposal can involve a gathering and burning of the mulch which requires a large burning area and is clearly environmentally unacceptable. The mulch has also been loosely gathered and disposed of in landfills. However, landfill expenses and the decreasing availability of landfills, make this an increasingly less desirable solution. It has also been proposed that the mulch be stockpiled in the field or disced in. However, inasmuch as the film does not, in a practical sense, biodegrade, this solution would clearly have adverse effects on the soil and subsequent planting operations.

Another suggested solution to the problem of disposal of agricultural plastic film mulch proposes the stripping of the mulch from the field with the loose mulch transported to a central area for compacting. It has also been suggested that the mulch be directly gathered from the field by mobile hay balers. However, this has been found to be impractical as the sheet material, because of the lengths thereof and the tendency to stretch, wrap up with the operating mechanisms of the hay baler and produce severe malfunctioning.

The patent to Gouker et al, U.S. Pat. No. 3,181,455, issued May 4, 1965, is of interest in disclosing apparatus specifically for gathering and baling sheet material directly from the field. This apparatus is intended to gather endless lengths of film with the leading end of the film manually inserted through a guide ring, a forwardly spaced guide grommet, and a pair of rollers immediately forward of the grommet. The rollers automatically pull the film from the field and must be timed to the progress of the apparatus through the field. Several potential problems are noted with regard to the Gouker et al apparatus. Inasmuch as film mulch is normally provided with transverse cuts for drainage at approximately every 100 feet or so, there is a tendency for the sheets to tear or sever along these cut lines. This would particularly occur as the sheets are anchored by soil along the edges thereof, providing a resistance to the pulling of the film from the field. When the film is so severed, the Gouker apparatus must be stopped and the film again manually fed through the rather elaborate arrangement required by Gouker.

Another potential problem arising in that the automatic pulling of the film from the field does not provide for any effective means for removing soil and debris from the film before the film reaches the constricted areas of the guide ring, grommet ring and rollers, thus giving rise to the possibility of the equipment jamming. Thus, Gouker et al also does not present an optimum solution to film removal and disposal.

SUMMARY OF THE INVENTION

The disposal system of the present invention provides for an efficient and practical gathering of the film from the field along with an in situ baling thereof for subsequent removal, preferably for recycling of the material.

As above noted, attempts to completely automate the film removal do not appear to have completely taken into account the problems arising from the specific nature of the sheet material. In the present system, the film is manually gathered into loose bundles with the soil and debris easily dropped therefrom as the film is lifted. The amount or length of film gathered in each bundle can be determined by the easily severed transverse drainage cuts or by a severing of the film at any convenient point along the length thereof so as to provide a bundle easily introduced into the apparatus as shall be described subsequently.

Subsequent to the manual cleaning and bundling of the film, with the bundles remaining in the field where formed, the mobile compacting apparatus of the invention is driven through the field with the bundles manually introduced thereto.

The apparatus includes a wheeled vehicle ground-supported and drawn along the field by a tractor or similar self-propelled vehicle. The tractor includes power generating equipment which comprises a power source for the compactor.

The apparatus includes a fore or forward end engaged to the tractor by an appropriate trailer hitch, or the like, and an aft or rear end. A compaction chamber is formed within the vehicle and extends forwardly from the aft end with the rear of the compaction chamber closed by an abutment forming closure panel or door.

A ram, including a piston or pressure plate, defines the front wall of the compaction chamber and is powered for periodic rearward movement to compact introduced film against the rear abutment.

Film is introduced into the compaction chamber through an upwardly extending hopper having an unencumbered interior and communicating directly with the compaction chamber immediately forward of the pressure plate. The hopper is provided with an upwardly directed flared mouth with introduced film dropping freely through the hopper and into the compaction chamber. The width of the hopper is substantially coextensive with that of the compaction chamber and provides for a clear visual inspection of the interior of the compaction chamber as the film is being introduced.

A rearwardly and downwardly extending open-top conveyor has a discharge end at the open mouth of the hopper and an intake end which, in operative position, is positioned at a height readily accessible to a field worker for the direct dropping of pregathered bundles of film thereon. The full exposure of the upwardly moving upper run of the conveyor, along with upwardly and outwardly inclined sideboards, allows for a dropping of the film bundles directly thereon without requiring any special feeding or threading procedures. Further, the bundles need not be tightly gathered or of any specific size other than of a size for convenient handling by an individual.

The conveyor is pivotally mounted for a selective elevating of the rear infeed end of the conveyor to allow for an opening of the closure panel of the compaction chamber and a discharge of the compacted and baled film. Appropriate wiring equipment will preferably be provided at the discharge end of the compaction chamber for a wiring of the bales.

The compaction apparatus will be manually controlled from controls positioned adjacent the upper end of the hopper and by an operator stationed thereat whereby a visual inspection of the operation, and in particular the actual loading of the compaction chamber through the hopper, can be maintained at all times. With regard to the actual compacting operation, it is intended that the compaction chamber be of a length whereby a complete filling thereof will require periodic operation of the compaction ram approximately 20 to 30 times to sequentially compact the film rearwardly toward the closure panel. It is contemplated that film gathered from approximately 2½ acres will be converted into a rectangular bale of approximately 2200 lbs. Ultimately, the bales will be removed, preferably being transported by flatbed trailers directly to recycling centers.

As previously noted, substantial economies and efficiencies can be achieved by providing a system which is partially manual and partially mechanical, including the dropping of the soil and debris from the film as it is manually gathered, and the avoidance of any mechanisms which could jam or otherwise adversely interact with either the film itself or any incidental debris which might be retained thereon. The apparatus used, because of the unencumbered movement of the film therethrough, can in fact accommodate incidental debris or soil which might be retained without affecting the compaction of the film and formation of the bales.

Other features and advantages of the invention will become more apparent from the detailed description of the invention following hereinafter.

BRIEF DESCRIPTION OF THE DRAWINGS

FIG. 1 is a perspective view of the apparatus of the invention in a field environment;

FIG. 2 is a longitudinal view of the apparatus with portions thereof schematically illustrated;

FIG. 3 is a top plan view of the apparatus with portions broken away for purposes of illustration; and FIG. 4 is a transverse cross-section through the compaction chamber and hopper.

DESCRIPTION OF PREFERRED EMBODIMENT

Referring now more specifically to the drawings, and in particular FIG. 1, the disposal system of the invention is specifically for the purpose of removing agricultural mulch film from fields. The agricultural film itself will normally be of an appropriate plastic or synthetic resinous material, preferably polyethylene.

The actual removal involves specific manual steps, performed in conjunction with unique mobile manually controlled power equipment, to achieve a highly efficient and practical operation, particularly as compared to prior attempts utilizing fully automated systems.

As suggested in FIG. 1, selected and convenient lengths of film 10 are manually gathered from the field into bundles 12 of a size readily handled by an individual field hand. 100 to 200 feet of film can be easily accommodated in such bundles with the strips being readily transversely severed either by a knife carried by the gatherer or by a tearing at the transverse drainage cuts 14 provided periodically along the length of the strip.

In gathering and bundling the film in this manner, soil and debris can be easily removed therefrom, for example by initially raising the film along the centerline thereof with the soil dropping off to each side thereof.

After the film has been manually loosely bundled, the mobile compaction apparatus 20 traverses the field along the aligned pregathered bundles 12 which are introduced into the apparatus.

The compaction apparatus 20 comprises a propelling vehicle 22, which may be a conventional farm tractor, and a trailing vehicle 24 with ground engaged wheels 26, preferably in tandem pairs for stability, and an elongate box-like body 28. The trailing vehicle 24 includes appropriate hitch means 30 projecting forwardly therefrom and joining appropriate hitch components on the tractor 22.

The body 28 of the trailing vehicle 24 contains an elongate fore to aft compaction chamber 32, extending rearwardly from a fore end 36 generally aligned with the wheel assembly, and an aft end coextensive with the rear of the body 28 and defined by a movable closure 38. The compaction chamber 32 is of a transverse width preferably equal to that of the body 28 with the opposed side walls 34 having smooth inner faces and being externally rigidified as by longitudinally extending exterior brace beams 40.

The closure panel 38 defines an abutment or abutment wall against which the material is compacted, and is hinged, as at 42 along one vertical edge thereof to the adjacent side wall 34 to pivot laterally away from the rear of the compaction chamber 32 to allow for discharge of a formed bale. The panel 38 is retained in its closed or abutment position by a latch system 44 which overlies the free edge of the panel and exerts a clamping force thereon preventing opening of the closure panel until intentionally released. As suggested in the drawings, the latch can comprise a pivotally mounted retaining flap controlled by a manual wheel for the selective exertion of a clamping force on the closure edge or a complete release thereof.

The compaction chamber also includes a closed bottom or bottom wall 46 having a smooth inner surface and, preferably, being externally rigidified. The bottom 46 of the compaction chamber 32 can, similar to the side walls 34, extend the full length of the vehicle body 28.

The enclosure of the compaction chamber 32 is completed by the top wall 48, also rigidified and provided with a smooth interior surface. This top wall 48 will extend forward of the compaction chamber 32 and define an operator's platform 50 for accommodating the operator 52 of the equipment in a position wherein all of the operating components are immediately visible.

The fore end 36 of the compaction chamber is open and closely receives a fore to aft reciprocating piston or pressure plate 54 which is activated to rearwardly compact the introduced pregathered bundles 12. The surface area of the piston 54 is substantially equal to the cross-sectional area of the interior of the compaction chamber 32, being only sufficiently smaller as to allow for free fore to aft sliding movement along with a full engagement of the introduced film material.

A vertically extending hopper 56 has a lower outlet end communicating directly with the fore portion of the compaction chamber immediately rearward of the forwardly retracted pressure plate 54 through an opening in the top wall 48. The hopper 56 and corresponding opening are approximately rectangular and of a transverse width equal to or only slightly less than that of the interior of the compaction chamber 32. As such, loosely gathered bundles introduced into the compaction chamber 32 through the hopper 56 will automatically extend across the full width of the compaction chamber and thus reduce or eliminate any tendency for voids to occur as the bundles are compacted. The interior surfaces of the hopper are smooth to allow for an unencumbered gravity discharge of the bundles therethrough and into the compaction chamber.

The upper inlet end of the hopper 56 is provided with an upwardly and outwardly flaring mouth 58, forming in effect a funnel facilitating vertical passage of the loosely gathered bundles of film mulch.

In order to deliver the pregathered bundles to the hopper mouth 58, the mobile trailer 24 is provided with an open conveyor 60, that is a conveyor with an open upwardly traveling upper run. The conveyor 60 includes appropriate structural side rails 62 which, at the upper ends thereof, are pivotally mounted, as at 64, to the opposed side walls of the hopper in a manner as to position the upper discharge end 66 of the conveyor over the hopper mouth 58 and so aligned as to vertically drop bundles from the conveyor and into the hopper.

The conveyor 60 is of substantially equal width with the hopper and extends rearwardly from the mounted forward discharge end 66 thereof beyond the rear of the vehicle body 28 and closure panel 38 of the compaction chamber 32 to a rear infeed end 68. The rear infeed end 68 of the conveyor 60 includes a flared apron 69 leading directly to the upper run of the conveyor. This infeed end 68 of the conveyor, during the introduction of the bundles 12, is positioned at a height whereby a field worker can easily drop a bundle thereon. The bundle in turn is carried by the upwardly traveling upper end of the conveyor to the open mouth of the hopper for vertical discharge thereinto.

Inasmuch as the film will be rather loosely gathered into the bundles, the conveyor 60, along the length of the upper run thereof, is provided with laterally upwardly inclined sideboards or retaining panels 70. These retained panels, with the upwardly opening upper run, define an unencumbered trough along the full length of the conveyor for the free movement of the bundles therealong to the hopper mouth. The surface of the conveyor belt will be such as to retain and move the film bundles without entangling with the loose film.

As will be appreciated from the drawings, the conveyor, in operative position, will preclude a full opening of the rear closure 38 and a discharge of the formed bales from the compaction chamber. Accordingly, the conveyor 60, at a point thereof aligned with the rear of the vehicle body 28, is engaged by a pair of opposed fluid rams 72, one end of which engage the opposed side rails of the conveyor and the other end of which mount to the vehicle body. The rams 72, in the retracted position thereof, will appropriately position the infeed end of the conveyor for loading, and, upon extension thereof, will sufficiently elevate the conveyor, about its pivotal engagement with the hopper at 64, to allow for a free rearward swinging of the rear closure panel 38 and a complete opening of the compaction chamber 32.

In operation of the compaction apparatus, the operator 52 will stand on the operator's platform 50 immediately forward of the hopper 56. The field hands will manually lift the pregathered bundles 12 onto the infeed end of the conveyor. The conveyor 60 will in turn upwardly move the bundles and discharge the bundles vertically into the hopper for unencumbered or free gravity movement thereof into the compaction chamber toward the forward end thereof. The operator 52 will have a clear view of the interior of the compaction chamber immediately below the hopper. Once he has visually determined that sufficient bundles have been introduced to fill the rear of the compaction chamber, he will, through appropriate controls 76, actuate the pressure plate or piston 54 to rearwardly compact the introduced bundles and move the bundles rearwardly away from the hopper opening. It is contemplated that the sequence of introducing loose bundles and actuating the piston for rearward compaction thereof be repeated 20 to 30 times, depending upon the fore to aft length of the compaction chamber and the fore to aft length of the hopper opening. As an example, the fore to aft length of the compaction chamber can be approximately $2\frac{1}{2}$ times the fore to aft length of the hopper opening.

The smooth walled interior of the hopper and compaction chamber allow for a free unencumbered passage of the film as it is being introduced and compacted. Further, the wide mouth of the hopper in conjunction with a hopper of substantially equal width with the compaction chamber allows for a continuous visual inspection of the flow of the material by the operator for maximum efficiency.

The power for the operating components of the trailing vehicle 24 are to be provided by the operating system or systems of the tractor or the like 22. While not limited thereto, the drawings schematically illustrate hydraulic systems for driving the conveyor, selectively positioning the conveyor and, most importantly, operating the pressure plate or piston 54. In addition to the control means 76 for the piston 54 being located on the operator's platform 50 immediately adjacent the hopper, it is also contemplated that the controls for selectively activating and stopping the conveyor be so located in that it will obviously be necessary to restrict the vertical discharge of bundles through the hopper as the piston 54 is extended to compact the received bundles within the chamber 52. After sufficient bundle compaction has been effected to define a bale, the conveyor will be elevated, the rear abutment-forming panel 38 opened, and the pressure panel 54 extended to rearwardly discharge the bale from the vehicle 24. While not illustrated, it is contemplated that conventional wiring means be provided to bind the bale of compacted bundles for subsequent handling, for example a depositing of the bales by forklift onto a flatbed trailer for removal and recycling.

It is to be appreciated that the mobile nature of the compaction apparatus, that is being wheel mounted and tractor drawn across the field, is significant in effecting an efficient collection of the film in that the necessity for attempting to transport the loose film to a remote stationary compaction center or recycling center is avoided.

The foregoing is considered illustrative of the invention, and it is not intended to limit the invention to the specific construction shown and described. Rather, all suitable modifications and equivalents are considered to be encompassed by the claims following hereinafter.

We claim:

1. A disposal system for gathered lengths of field film mulch, a wheeled vehicle adapted to be drawn forwardly along a field for the manual loading of pregathered film mulch, said vehicle having an elongate body with a fore end and an aft end, an elongate fore to aft compaction chamber in said body terminating at said aft end of said body, said aft end being defined by a closure panel selectively movable between a closed position forming a rear abutment wall in said compaction chamber and an open position allowing free discharge from said chamber, said chamber including fore to aft side, top and bottom walls extending from said closure panel, an opening in said top wall in forwardly spaced relation to said closure panel and communicating directly with said chamber, a hopper mounted to said top wall in vertical alignment with said opening, said hopper having a lower outlet end substantially coextensive with said opening and an upper inlet end, said hopper having an unencumbered interior from said upper inlet end to said opening allowing free downward movement of film mulch therethrough and into said chamber and a direct visual inspection of said chamber and the film mulch in said chamber, an elongate conveyor mounted to said body and extending fore to aft in alignment with said hopper and between a forward discharge end overlying said hopper and a rear infeed end rearward of said closure panel, said conveyor having an open upper run extending the length thereof, said conveyor being inclined downward and rearward from said discharge end with said rear infeed end below said top wall and positioned relative to the ground for manual placing of film mulch thereon, a compaction plate in said chamber defining a forward wall of said chamber and mounted for rearward movement from a forward position for compaction of introduced film mulch against said rear abutment wall, and means for selectively elevating said rear infeed end of said conveyor to allow a rearward movement of said closure panel to its open position for discharge of compacted film mulch from said chamber rearward of said body and below said conveyor.

2. The disposal system of claim 1 wherein said conveyor includes retaining panels substantially coextensive with the upper run of said conveyor along the opposed sides thereof, said retaining panels being laterally outward and upwardly inclined relative to said upper run of said conveyor and defining an upwardly opening trough along said upper run.

3. The disposal system of claim 2 wherein said hopper and said conveyor upper run are of substantially equal widths.

4. The disposal system of claim 3 including power means for moving said compaction plate, and manually actuatable control means for activating said power means, said control means being mounted on said body adjacent said hopper for access thereto by a user positioned to visually inspect said chamber through said hopper.

5. The disposal system of claim 1 wherein said forward discharge end of said conveyor is pivotally mounted to said hopper.

6. The disposal system of claim 1 wherein said hopper and said conveyor upper run are of substantially equal widths.

7. A disposal system for gathered lengths of field film mulch, a wheeled vehicle adapted to be drawn forwardly along a field for the manual loading of pregathered film mulch, said vehicle having an elongate body with a fore end and an aft end, an elongate fore to aft compaction chamber in said body terminating at said aft end of said body, said aft end being defined by a closure panel selectively movable between a closed position forming a rear abutment wall in said compaction chamber and an open position allowing free discharge from said chamber, said chamber including fore to aft side, top and bottom walls extending from said closure panel, an opening in said top wall in forwardly Spaced relation to said closure panel and communicating directly with said chamber, a hopper mounted to said top wall in vertical alignment with said opening, said hopper having a lower outlet end substantially coextensive with said opening and an upper inlet end, said hopper having an unencumbered interior from said upper inlet end to said opening allowing free downward movement of film mulch therethrough and into said chamber and a direct visual inspection of said chamber and the film mulch in said chamber, an elongate conveyor mounted to said body and extending fore to aft in alignment with said hopper and between a forward discharge end overlying said hopper and a rear infeed end rearward of said closure panel, said conveyor having an open upper run extending the length thereof, said conveyor being inclined downward and rearward from said discharge end with said rear infeed end below said top wall and positioned relative to the ground for manual placing of film mulch thereon, a compaction plate in said chamber defining a forward wall of said chamber and mounted for rearward movement from a forward position for compaction of introduced film mulch against said rear abutment wall, and power means for moving said compaction plate, and manually actuatable control means for activating said power means, said control means being mounted on said body adjacent said hopper for access thereto by a user positioned to visually inspect said chamber through said hopper.

8. A method of removing agricultural film mulch from a field, comprising the steps of manually gathering selected lengths of film mulch into separate individual bundles, progressively positioning mobile compaction apparatus adjacent said bundles, said mobile compaction apparatus including a compaction chamber and an infeed conveyor having a lower end portion positioned in spaced relation above and manually accessible from ground level, and an upper end communicating with said compaction chamber, manually loading said bundles individually on said lower end portion of said conveyor, vertically discharging said individual bundles from said upper end of said conveyor into said compaction chamber with said bundles moving unencumbered from said conveyor to said compaction chamber, periodically compacting said bundles in said chamber after introduction of a selected number of bundles to define a bale, discharging said bale from said chamber, providing an operator above said compaction chamber, visually inspecting said compaction chamber to determine the appropriate time for compacting said bundles within said chamber, and manually actuating controls for activating equipment to compact said chamber received bundles.

* * * * *